US006862359B2

(12) United States Patent
Nordqvist et al.

(10) Patent No.: US 6,862,359 B2
(45) Date of Patent: Mar. 1, 2005

(54) HEARING PROSTHESIS WITH AUTOMATIC CLASSIFICATION OF THE LISTENING ENVIRONMENT

(75) Inventors: Nils Peter Nordqvist, Sollentuna (SE); Arne Leijon, Stockholm (SE)

(73) Assignee: GN ReSound A/S, Taastrup (DK)

( * ) Notice: Subject to any disclaimer, the term of this patent is extended or adjusted under 35 U.S.C. 154(b) by 0 days.

(21) Appl. No.: 10/157,547

(22) Filed: May 29, 2002

(65) Prior Publication Data

US 2003/0112987 A1 Jun. 19, 2003

Related U.S. Application Data

(63) Continuation-in-part of application No. 10/023,264, filed on Dec. 18, 2001.

(51) Int. Cl.[7] .......................... H04R 25/00; G10L 15/14

(52) U.S. Cl. ........................ 381/312; 381/320; 704/233; 704/256

(58) Field of Search .......................... 381/23.1, 60, 312, 381/313, 320, 321; 704/233, 255, 256

(56) References Cited

U.S. PATENT DOCUMENTS

| | | | | |
|---|---|---|---|---|
| 5,535,305 A | 7/1996 | Acero et al. | ............... | 395/2.65 |
| 5,687,241 A | 11/1997 | Ludvigsen | ................. | 381/68.4 |
| 2002/0037087 A1 * | 3/2002 | Allegro et al. | .............. | 381/317 |

FOREIGN PATENT DOCUMENTS

| | | | |
|---|---|---|---|
| EP | 0 869 478 A2 | 3/1998 | ............. G10L/5/06 |
| EP | 0881 625 A2 | 5/1998 | ........... G10L/13/00 |
| JP | 08350940 | 12/1996 | ............. G10L/3/00 |
| WO | WO 98/27787 | 12/1996 | ........... H04R/25/00 |

OTHER PUBLICATIONS

S. Oberle, et al., "HMM–Based Speech Enhancement Using Pitch Period Information in Voiced Speech Segments", 1997 IEEE International Symposium on Circuits and Systems, Jun. 9–12, 1997 Hong Kong, pp. 2645–2648.

S. Oberle, et al., "Recognition of Acoustical Alarm Signals for the Profoundly Deaf Using Hidden Markov Models", IEEE International Symposium on Circuits and Systems, 1995, No. 3, pp. 2285–2288.

L.R. Rabiner, "A Tutorial on Hidden Markov Models and Selected Applications in Speech Recognition", Proceedings of the IEEE, vol. 77, No. 2, Feb. 1989, pp. 257–286.

* cited by examiner

*Primary Examiner*—Curtis Kuntz
*Assistant Examiner*—Brian Ensey
(74) *Attorney, Agent, or Firm*—Michael J. Bolan; Bingham McCutchen LLP

(57) ABSTRACT

A hearing prosthesis that automatically adjusts itself to a surrounding listening environment by applying Hidden Markov Models is provided. In one aspect, classification results are utilized to support automatic parameter adjustment of a parameter or parameters of a predetermined signal processing algorithm executed by processing means of the hearing prosthesis. According to another aspect, features vectors extracted from a digital input signal of the hearing prosthesis and processed by the Hidden Markov Models represent substantially level and/or absolute spectrum shape independent signal features of the digital input signal. This level independent property of the extracted features vectors provides robust classification results in real-life acoustic environments.

12 Claims, 5 Drawing Sheets

HEARING PROSTHESIS WITH AUTOMATIC CLASSIFICATION OF THE LISTENING ENVIRONMENT

This application is a continuation-in-part of Application Ser. No. 10/023,264 filed Dec. 18, 2001.

FIELD OF THE INVENTION

The present invention relates to a hearing prosthesis and method providing automatic identification or classification of a listening environment by applying one or several predetermined Hidden Markov Models to process acoustic signals obtained from the listening environment. The hearing prosthesis may utilise determined classification results to control parameter values of a predetermined signal processing algorithm or to control a switching between different preset programs so as to optimally adapt the signal processing of the hearing prosthesis to a user's current listening environment.

BACKGROUND OF THE INVENTION

Today's digitally controlled or Digital Signal Processing (DSP) hearing instruments or aids are often provided with a number of preset listening programs or preset programs. These preset programs are often included to accommodate comfortable and intelligible reproduced sound quality in differing listening environments. Audio signals obtained from these listening environments may possess very different characteristics, e.g. in terms of average and maximum sound pressure levels (SPLs) and/or frequency content. Therefore, for DSP based hearing prostheses, each type of listening environment may be associated with a particular preset program wherein a particular setting of algorithm parameters of a signal processing algorithm of the hearing prosthesis to ensure that the user is provided with an optimum reproduced signal quality in all types of listening environments. Algorithm parameters that typically could be adjusted from one listening program to another include parameters related to broadband gain, corner frequencies or slopes of frequency-selective filter algorithms and parameters controlling e.g. knee-points and compression ratios of Automatic Gain Control (AGC) algorithms.

Consequently, today's DSP based hearing instruments are usually provided with a number of different preset programs, each program tailored to a particular listening environment category and/or particular user preferences. Signal processing characteristics of each of these preset programs is typically determined during an initial fitting session in a dispenser's office and programmed into the instrument by transmitting or activating corresponding algorithms and algorithm parameters to a non-volatile memory area of the hearing prosthesis.

The hearing aid user is subsequently left with the task of manually selecting, typically by actuating a push-button on the hearing aid or a program button on a remote control, between the preset programs in accordance with his current listening or sound environment. Accordingly, when attending and leaving various sound environments in his/hers daily whereabouts, the hearing aid user may have to devote his attention to delivered sound quality and continuously search for the best preset program setting in terms of comfortable sound quality and/or the best speech intelligibility.

It would therefore be highly desirable to provide a hearing prosthesis such as a hearing aid or cochlea implant device that was capable of automatically classifying the user's listening environment so as to belong to one of a number of relevant or typical everyday listening environment categories. Thereafter, obtained classification results could be utilised in the hearing prosthesis to allow the device to automatically adjust signal processing characteristics of a selected preset program, or to automatically switch to another more suitable preset program. Such a hearing prosthesis will be able to maintain optimum sound quality and/or speech intelligibility for the individual hearing aid user across a range of differing and relevant listening environments.

In the past there have been made attempts to adapt signal processing characteristics of a hearing aid to the type of acoustic signals that the aid receives. U.S. Pat. No. 5,687,241 discloses a multi-channel DSP based hearing instrument that utilises continuous determination or calculation of one or several percentile value of input signal amplitude distributions to discriminate between speech and noise input signals. Gain values in each of a number of frequency channels is altered in response to detected levels of speech and noise. However, it is often desirable to provide a more fine-grained characterisation of a listening environment than only discriminating between speech and noise. As an example, it may be desirable to switch between an omni-directional and a directional microphone preset program in dependence of, not just the level of background noise, but also on further signal characteristics of this background noise. In situations where the user of the hearing prosthesis communicates with another individual in the presence of the background noise, it would be beneficial if it was possible to identify and classify the type of background noise. Omni-directional operation could be selected in the event that the noise being traffic noise to allow the user to clearly hear approaching traffic independent of its direction of arrival. If, on the other hand, the background noise was classified as being babble-noise, the directional listening program could be selected to allow the user to hear a target speech signal with improved signal-to-noise ratio (SNR) during a conversation.

A detailed characterisation of e.g. a microphone signal may be obtained by applying Hidden Markov Models for analysis and classification of the microphone signal. Hidden Markov Models are capable of modelling stochastic and non-stationary signals in terms of both short and long time temporal variations. Hidden Markov Models have been applied in speech recognition as a tool for modelling statistical properties of speech signals. The article "A Tutorial on Hidden Markov Models and Selected Applications in Speech Recognition", published in Proceedings of the IEEE, VOL 77, No. 2, February 1989 contains a comprehensive description of the application of Hidden Markov Models to problems in speech recognition.

The present applicants have, however, for the first time applied Hidden Markov Models to classify the listening environment of a hearing prosthesis. According to one aspect of the invention, classification results are utilised to support automatic parameter adjustment of a parameter or parameters of a predetermined signal processing algorithm executed by processing means of the hearing prosthesis. According to another aspect of the invention, features vectors extracted from a digital input signal of the hearing prostheses and processed by the Hidden Markov Models represent substantially level and/or absolute spectrum shape independent signal features of the digital input signal. This level independent property of the extracted features vectors provides robust classification results in real-life acoustic environments.

DESCRIPTION OF THE INVENTION

A first aspect of the invention relates to a hearing prosthesis comprising:

an input signal channel providing a digital input signal in response to acoustic signals from a listening environment, processing means adapted to process the digital input signal in accordance with a predetermined signal processing algorithm to generate a processed output signal, an output transducer for converting the processed output signal into an electrical or an acoustic output signal. The processing means are further adapted to:

extract feature vectors, O(t), representing predetermined signal features of consecutive signal frames of the digital input signal, process the extracted feature vectors, or symbol values derived therefrom, with a Hidden Markov Model associated with a predetermined sound source to determine probability values for the predetermined sound source being active in the listening environment, wherein the extracted features vectors represent substantially level independent signal features, or absolute spectrum shape independent signal features, of the consecutive signal frames.

The hearing prosthesis may comprise a hearing instrument or hearing aid such as a Behind The Ear (BTE), an In The Ear (ITE) or Completely In the Canal (CIC) hearing aid.

The input signal channel may comprise a microphone that provides an analogue input signal or directly provides the digital signal, e.g. in a multi-bit format or in single bit format, from an integrated analogue-to-digital converter. The input signal to the processing means is preferably provided as a digital input signal. If the microphone provides its output signal in analogue form, the output signal is preferably converted into a corresponding digital input signal by a suitable analogue-to-digital converter (A/D converter). The A/D converter may be included on an integrated circuit of the hearing prosthesis. The analogue output signal of the microphone signal may be subjected to various signal processing operations, such as amplification and bandwidth limiting, before being applied to the A/D converter. An output signal of the A/D converter may be further processed, e.g. by decimation and delay units, before the digital input signal is applied to the processing means.

The output transducer that converts the processed output signal into an acoustic or electrical signal or signals may be a conventional hearing aid speaker often called a "receiver" or another sound pressure transducer producing a perceivable acoustic signal to the user of the hearing prosthesis. The output transducer may also comprise a number of electrodes that may be operatively connected to the user's auditory nerve or nerves.

According to the invention, the processing means are adapted to extract feature vectors, O(t), that represent predetermined signal features of the consecutive signal frames of the digital input signal. The feature vectors may be extracted by initially segmenting the digital input signal into consecutive, or running, signal frames that each has a predetermined duration $T_{frame}$. The signal frames may all have substantially equal length or duration or may, alternatively, vary in length, e.g. in an adaptive manner in dependence of certain temporal or spectral features of the digital input signal. The signal frames may be non-overlapping or overlapping with a predetermined overlap such as an overlap between 10–50%. An overlap prevents that sharp discontinuities are generated at boundaries between neighbouring signal frames of the consecutive signal frames and additionally counteracts window effects of an applied window function such as a Hanning window. The predetermined signal processing algorithm may process the digital input signal on a sample-by-sample basis or on a frame-by-frame basis with a frame length equal to or different from $T_{frame}$.

According to the invention, the extracted features vectors represent substantially level and/or absolute spectrum shape independent signal features of the consecutive signal frames. The level independent property of the extracted features vectors makes the classification results provided by the Hidden Markov Model robust against inevitable variations of sound pressure levels that are associated with real-life listening environments even when they belong to the same category of listening environments. An average pressure level at the microphone position of the hearing prosthesis generated by a speech source may vary from about 60 dB SPL to about 90 dB SPL during a relevant and representative range of everyday life situations. This variation is caused by differences in acoustic properties among listening rooms, varying vocal efforts of a speaker, background noise level, distance variations to the speaker etc. Even in listening environments without background or interfering noise, the level of clean speech may vary considerably due to differences between vocal efforts of different speakers and/or varying distances to the speaker because the speaker or the user of the hearing prosthesis moves around in the listening environment.

Furthermore, even for a fixed level of the acoustic signal at the microphone position, the level of the digital input signal provided to the processing means of the hearing prosthesis may vary between individual hearing prosthesis devices. This variation is caused by sensitivity and/or gain differences between individual microphones, preamplifiers, analogue-to-digital converters etc. The substantial level independent property of the extracted feature vectors in accordance with the present invention secures that such device differences have little or no detrimental effect on performance of the Hidden Markov Model. Therefore, robust classification results of the listening environment are provided over a large range of sound pressure levels. The categories of listening environments are preferably selected so that each category represents a typical everyday listening situation which is important for the user in question or for a certain population of users.

The extracted feature vectors preferably comprise or represent sets of differential spectral signal features or sets of differential temporal signal features, such as sets of differential cepstrum parameters. The differential spectral signal features may be extracted by first calculating a sequence of spectral transforms from the consecutive signal frames. Thereafter, individual parameters of each spectral transform in the resulting sequence of transforms are filtered with an appropriate filter. The filter preferably comprises a FIR and/or an IIR filter with a transfer function or functions that approximate a differentiator type of response to derive differential parameters. The desired level independency of the extracted feature vectors can, alternatively, be obtained by using cepstrum parameter sets as feature vectors and discard cepstrum parameter number zero that represents the overall level of a signal frame. Finally, for some applications it may be advantageous to use feature vectors which comprise both cepstrum parameter and differential cepstrum parameters.

Spectral signal features and differential spectral signal features may be derived from transforms such as Discrete Fourier Transforms, FFTs, Linear Predictive Coding, cepstrum transforms etc. Temporal signal features and differential temporal signal features may comprise zero-crossing rates and amplitude distribution statistics of the digital input signal.

The following standard notation describes a Hidden Markov Model in the present specification and claims:

$$\lambda^{source}=\{A^{source}, b(O(t)), \alpha_0^{source}\}, \text{ wherein}$$

$A^{source}$=A state transition probability matrix;

$b(O(t))$=Probability function for the observation $O(t)$ for each state of the Hidden Markov Model;

$\alpha_0^{source}$=An initial state probability distribution vector.

According to the invention, the extracted feature vectors, or symbol values derived there from in case of a discrete Hidden Markov Model, are processed with the Hidden Markov Model. The Hidden Markov Model models the associated predetermined sound source. Adapting or training the Hidden Markov Model to model a particular sound source is described in more detail below. The output of the Hidden Markov Model is a sequence of probability values or a sequence of classification results, i.e. a classification vector. The sequence of probability values indicates the probability for the predetermined sound source is active in the listening environment over time. Each probability value may be represented by a numerical value, e.g. value between 0 and 1, or by a categorical label such as low, medium, high.

A predetermined sound source may represent any natural or synthetic sound source such as a natural speech source, a telephone speech source, a traffic noise source, a multi-talker or babble source, a subway noise source, a transient noise source, a wind noise source, a music source etc. and any combination of these. A predetermined sound source that only models a certain type of natural or synthetic sound sources such as speech, traffic noise, babble, wind noise etc. will in the present specification and claims be termed a primitive sound source or unmixed sound source.

A predetermined sound source may also represent a mixture or combination of natural or synthetic sound sources. Such a mixed predetermined sound source may model speech and noise, such as traffic noise and/or babble noise, mixed in a certain proportion to e.g. create a particular signal-to-noise ratio (SNR) in that predetermined sound source. For example, a predetermined sound source may represent a combination of speech and babble at a particular target SNR, such as 5 dB or 10 dB or more preferably 20 dB.

The Hidden Markov Model may thus model a primitive sound source, such as clean speech, or a mixed sound source, such as speech and babble at 10 dB SNR. Classification results from the Hidden Markov Model may therefore directly indicate the current listening environment category of the hearing prosthesis.

According to a preferred embodiment of the invention, a plurality of discrete Hidden Markov Models is provided in the hearing prosthesis. A first layer of discrete Markov Models is adapted to model several different primitive sound sources. The first layer generates a respective sequences of probability values for the different primitive sound source. A second layer comprises at least one Hidden Markov Model which models three different categories of listening environments. Each category of listening environment is modelled as a combination of several of the primitive sound sources of the first layer. The second layer Hidden Markov Model receives and processes the probability values provided by the first layer to categorize the user's current listening environment. For example, the first layer may comprise three discrete Hidden Markov Models modelling primitive sound sources: traffic noise, babble noise, clean speech, respectively. The second layer Hidden Markov Model models listening environment categories: clean speech, speech in babble, speech in traffic and indicates classification results in respect of each of the environment categories based on an analysis of the classification results provided by the first layer. This embodiment of the invention allows the classifier to model complex listening environments at many different SNRs with relatively few Hidden Markov Models. It may also be advantageous to add a discrete Hidden Markov Model for modelling a music sound source.

Alternatively, a listening environment category may be associated with a number of different mixed sound sources that all represent e.g. speech and traffic noise but at varying SNRs. A set of Hidden Markov Models that models the mixed sound sources provides classification results for each of the mixed sound sources to allow the processing means to recognise the particular listening environment category, in this example speech and traffic noise, and also the actual SNR in the listening environment.

In the present specification and claims the term "predetermined signal processing algorithm" designates any processing algorithm, executed by the processing means of the hearing prosthesis, that generates the processed output signal from the input signal. Accordingly, the "predetermined signal processing algorithm" may comprise a plurality of sub-algorithms or sub-routines that each performs a particular subtask in the predetermined signal processing algorithm. As an example, the predetermined signal processing algorithm may comprise different signal processing subroutines or software modules such as modules for frequency selective filtering, single or multi-channel dynamic range compression, adaptive feedback cancellation, speech detection and noise reduction etc. Furthermore, several distinct sets of the above-mentioned signal processing subroutines may be grouped together to form two, three or more different preset programs. The user may be able to manually select between several preset programs in accordance with his/hers preferences.

According to a preferred embodiment of the invention, the processing means are adapted to control characteristics of the predetermined signal processing algorithm in dependence of the determined probability values for the predetermined sound source being active in the listening environment. The characteristics of the predetermined signal processing algorithm may automatically be adjusted in a convenient manner by adjusting values of algorithm parameters of the predetermined signal processing algorithm. These parameter values may control certain characteristics one or several signal processing subroutines such as corner-frequencies and slopes of frequency selective filters, compression ratios and/or compression threshold levels of dynamic range compression algorithms, adaptation rates and probe signal characteristics of adaptive feedback cancellation algorithms, etc. Changes to the characteristics of the predetermined signal processing algorithm may conveniently be provided by adapting the processing means to automatically switch between a number of different preset programs in accordance with the probability values for the predetermined sound source being active.

In this latter embodiment of the invention, preset program 1 may be tailored to operate in a speech-in-quiet listening environment category, while preset program 2 may be tailored to operate in a traffic noise listening environment category. Preset program 3 could be used as a default listening program if none of the above-mentioned categories are recognised. The hearing prosthesis may therefore comprise a first Hidden Markov Model modelling speech signals with a high SNR such as more than 20 dB or more than 30 dB and a second Hidden Markov Model modelling traffic noise. Thereby, the hearing prosthesis may continuously classify the user's current listening in accordance with obtained classification results from the first and second Hidden Markov Model and in response automatically change between preset programs 1, 2 and 3.

Values of the algorithm parameters are preferably loaded from a non-volatile memory area, such as an EEPROM/ Flash memory area or a RAM memory with some sort of secondary or a back-up power supply, into a volatile data memory area of the processing means such as data RAM or a register during execution of the predetermined signal processing algorithm. The non-volatile memory area secures that all relevant algorithm parameters can be retained during power supply interruptions such as interruptions caused by the user's removal of the hearing aid battery or manipulation of an ON/OFF supply switch.

The processing means may comprise one or several processors and its/their associated memory circuitry. The processor may be constituted by a fixed point or floating point Digital Signal Processor (DSP). The DSP may execute numerical operations required by the predetermined signal processing algorithm as well as control data or house-holding handling. The control data tasks may include tasks such as monitoring and reading states or values of external interface ports and reading from and/or writing to programming ports. Alternatively, the processing means may comprise a DSP that performs the numerical calculations, i.e. multiplication, addition, division, etc. and a co-processor such as a commercially available, or even proprietary, microprocessor which handles the control data tasks which typically involve logic operations, reading of interface ports and various types of decision making.

The DSP may be a software programmable device executing the predetermined signal processing algorithm and the Hidden Markov Model or Models in accordance with respective sets of instructions stored in an associated program RAM area. As previously mentioned, a data RAM may be integrated with the processing means to store intermediate values of the algorithm parameters and other data variables during execution of the predetermined signal processing algorithm as well as various other control data. The use of a software programmable DSP device may be advantageous for some applications due to its support of rapidly prototyping enhanced versions of the predetermined signal processing algorithm and/ or the Hidden Markov Model or Models.

Alternatively, the processing means may be constituted by a hard-wired or fixed DSP adapted to execute the predetermined signal processing algorithm in accordance with a fixed set of instructions from an associated logic controller. In this type of hard-wired processor architecture, the memory area storing values of the related algorithm parameters may be provided in the form of a register file or as a RAM area if the number of algorithm parameters justifies the latter solution.

The Hidden Markov Model may comprise a discrete Hidden Markov Model, $\lambda^{source}=\{A^{source},B^{source},\alpha_0^{source}\}$, wherein $B^{source}$ is an observation symbol probability distribution matrix which serves as a discrete equivalent of the general probability function, b(O(t)), defining the probability for the input observation O(t) for each state of a Hidden Markov Model.

In this discrete case, the processing means are preferably adapted to compare each of the extracted feature vectors, O(t), with a predetermined feature vector set, commonly referred to as a "codebook", to determine, for at least some feature vectors, corresponding symbol values that represent the feature vectors in question. Preferably, substantially each extracted feature vector has a corresponding symbol value. The procedure accordingly generates an observation sequence of symbol values and is often referred to as "vector quantization". This observation sequence of symbol values is processed with the discrete Hidden Markov Model to determine the probability values for the predetermined sound source is active.

Temporal and spectral characteristics of a predetermined sound source that is used in the training of its associated Hidden Markov Model may have been obtained based on real-life recordings of one or several representative sound sources. Several recordings can be concatenated in a single recording (or sound file). For a predetermined sound source that represent clean speech, the present inventors have found that utilising recordings from about 10 different speakers, preferably 5 males and 5 females, as training material generally provides good classification results from a Hidden Markov Model that models such a clean speech type of sound source.

A mixed sound source, that represents a combination of primitive sound sources, is preferably provided by post-processing of one or several real-life recordings of representative primitive sound sources to obtain the desired characteristics of the mixed sound source, such as a target SNR.

From such a concatenated sound source recording, feature vectors, that preferably correspond to those feature vectors that will be extracted by the processing means of the hearing prosthesis during normal operation, are extracted. The extracted feature vectors form a training observation sequence for the associated continuous or discrete Hidden Markov Model. Duration of the training sequence depends on the type of sound source, but it has been found that a duration between 3 and 20 minutes, such as between 4 and 6 minutes is adequate for many types of predetermined sound sources including speech sound sources. Thereafter, for each predetermined sound source, its associated Hidden Markov Model is trained with the generated training observation sequence. The training of discrete Hidden Markov Models is preferably performed by the Baum-Welch iterative algorithm. The training generates values of, $A^{source}$, the state transition probability matrix, values for $B^{source}$ the observation symbol probability distribution matrix (for discrete Hidden Markov Model models) and values of $\alpha_0^{source}$, the initial state probability distribution vector. If the discrete Hidden Markov Model is ergodic, the values of the initial state probability distribution vector are determined from the state transition probability matrix.

If discrete Hidden Markov Models are utilised, the codebook, may have been determined by an off-line training procedure which utilised real-life sound source recordings. The number of feature vectors in the predetermined feature vector set which constitutes the codebook may vary depending on the particular application. For hearing aid applications, a codebook comprising between 8 and 256 different feature vectors, such as between 32–64 different feature vectors will often provide adequate coverage of a complete feature space. A comparison between each of the feature vectors computed from the consecutive signal frames and the codebook provides a symbol value which may be selected by choosing an integer index belonging to that codebook entry nearest to the feature vector in question. Thus, the output of this vector quantization process may be a sequence of integer indexes representing the corresponding symbol values.

To obtain a predetermined feature vector set with individual feature vectors that closely resembles corresponding feature vectors generated in the hearing prosthesis during on-line processing of the digital input signal, i.e. normal use, the real life sound recordings may have been obtained by passing a signal through an input signal path of a target hearing prosthesis. By adopting such a procedure, frequency response deviations as well as other linear and/or non-linear distortions generated by the input signal path of the target hearing prosthesis are compensated in the operational hearing prosthesis since corresponding signal distortions are provided in the predetermined feature vector set.

Alternatively, a similar advantageous effect may be obtained by performing, prior to the extraction of the feature vector set or codebook, a suitable pre-processing of the real-life sound recordings. This pre-processing is similar, or substantially identical, to the processing performed by the input signal path of the target hearing prosthesis. This latter solution may comprise applying suitable analogue and/or digital filters or filter algorithms to the input signal tailored to a priori known characteristics of the input signal path in question.

While it has proven helpful to utilise so-called left-to-right Hidden Markov Models in the field of speech recognition where known temporal characteristics of words and utterances are matched in the model structure, the present inventors have found it advantageous to use at least one ergodic Hidden Markov Model, and, preferably, to use ergodic Hidden Markov Models for all employed Hidden Markov Models. An ergodic Hidden Markov Model is a model in which it is possible to reach any internal state from any other internal state in the model.

The preferred number of internal model states of any particular Hidden Markov Model of the plurality of Hidden Markov Models depend on the particular type of predetermined sound source that it is intended to model. A relatively simple nearly constant noise source may be adequately modelled by a Hidden Markov Model with only a few internal states while more complex sound sources such as speech or mixed speech and complex noise sources may require additional internal states. Preferably, a Hidden Markov Model comprises between 2 and 10 internal states, such as between 3 and 8 internal states. According to a preferred embodiment of the invention, four discrete Hidden Markov Models are used in a proprietary DSP in a hearing instrument, where each of the four Hidden Markov Models has 4 internal states. The four internal states are associated with four common predetermined sound sources: speech source, traffic noise source, multi-talker or babble source, and subway noise source, respectively. A codebook with 64 feature vectors, each consisting of 12 delta-cepstrum parameters, is utilised to provide vector quantisation of the feature vectors derived from the input signal of the hearing aid. However, the predetermined feature vector set may be extended without taking up excessive amount of memory in the hearing aid DSP.

The processing means may be adapted to process the input signal in accordance with at least two different predetermined signal processing algorithms, each being associated with a set of algorithm parameters, where the processing means are further adapted to control a transition between the at least two predetermined signal processing algorithms in dependence of the element value(s) of the classification vector. This embodiment of the invention is particularly useful where the hearing prosthesis is equipped with two closely spaced microphones, such as a pair of omni-directional microphones, generating a pair of input signals which can be utilised to provide a directional signal by well-known delay-subtract techniques and a non-directional or omni-directional signal, e.g. by processing only one of the input signals. The processing means may control a transition between a directional and omni-directional mode of operation in a smooth manner through a range of intermediate values of the algorithm parameters so that the directionality of the processed output signal gradually increases/decreases. The user will thus not experience abrupt changes in the reproduced sound but rather e.g. a smooth improvement in signal-to-noise ratio.

To control such transitions between two predetermined signal processing algorithms, the processing means may further comprise a decision controller adapted to monitor the elements of the classification vector or classification results and control transitions between the plurality of Hidden Markov Models in accordance with a predetermined set of rules. These rules may include suitable transition time constants and hysteresis. The decision controller may advantageously operate as an intermediate layer between the classification results provided by the Hidden Markov Models and algorithm parameters of the predetermined signal processing algorithm. By monitoring classification results and controlling the value(s) of the related algorithm parameter(s) in accordance with rules about maximum and minimum switching times between Hidden Markov Models and, optionally, interpolation characteristics between the algorithm parameters, the inherent time scales on which the Hidden Markov Models operate are smoothed. This embodiment of the invention is particularly advantageous if the Hidden Markov Models model short term signal features of their respective predetermined sound sources. As one example, one discrete Hidden Markov Model may be associated with a speech source and another discrete Hidden Markov Model associated with a babble noise source. These discrete Hidden Markov Models may operate on a sequence of symbol values where each symbol represents signal features over a time frame of about 6 ms. Conversational speech in a "cocktail party" listening environment may cause the classification results provided by the discrete Hidden Markov Models to rapidly alternate between indicating one or the other predetermined sound source as the active sound source in the listening environment due to pauses between words in a conversation. In such a situation, the decision controller may advantageously lowpass filter or smooth out the rapidly alternating transitions and determine an appropriate listening environment category based on long term features of the transitions between the two discrete Hidden Markov Models.

The decision controller preferably comprises a second set of Hidden Markov Models operating on a substantially longer time scale of the input signal than the Hidden Markov Model(s) in a first layer. Thereby, the processing means are adapted to process the observation sequence of symbol values or the feature vectors with a first set of Hidden Markov Models operating at a first time scale and associated with a first set of predetermined sound sources to determine element values of a first classification vector. Subsequently, the first classification vector is processed with the second set of Hidden Markov Models operating at a second time scale and associated with a second set of predetermined sound sources to determine element values of a second classification vector.

The first time scale is preferably within 10–100 ms to allow the first set of Hidden Markov Models to operate on short term features of the digital input signal. These short term signal features are relevant for modelling common speech and noise sound sources. The second time scale is preferably 1–60 seconds, such as between 10 and 20 seconds to allow the second set of Hidden Markov Models to operate on long term signal features that model changes between different listening environments. A change of listening environment category usually occurs when the user moves between differing listening environments, e.g. between a subway station and the interior of a train, or between a domestic environment and the interior of a car etc.

According to another aspect of the invention, a set of Hidden Markov Models are utilised to recognise respective isolated words to provide the hearing prosthises with a capability of identifying a small set of voice commands which the user may utilise to control one or several functions of the hearing aid by his/hers voice. For this word recognition feature, discrete left-right Hidden Markov Models are preferably utilised rather than the ergodic Hidden Markov Models that it was preferred to apply to the task of providing automatic listening enviroment classification. Since a left-right Hidden Markov Model is a special case of an ergodic Hidden Markov Model, the Model structure applied for the above-described ergodic Hidden Markov Models may at least be partly re-used for the left-right Hidden Markov Models. This has the advantage that DSP memory and other hardware resources may be shared in a hearing prosthesis that provides both automatic listening enviroment classification and word recognition.

Preferably, a number of isolated word Hidden Markov Models, such as 2–8 Hidden Markov Models, is stored in the hearing prosthesis to allow the processing means to recognise a corresponding number of distinct words. The output from each of the isolated word Hidden Markov Models is a probability for a modelled word being spoken. Each of the isolated word Hidden Markov Models must be trained on the particular word or command it must recognise during on-line processing of the input signal. The training could be performed by applying a concatenated sound source recording including the particular word or command spoken by a number of different individuals to the associated Hidden Markov Model. Alternatively, the training of the isolated word Hidden Markov Models could be performed during a fitting session where the words or commands modelled were spoken by the user himself to provide a personalised recognition function in the user's hearing prosthesis.

BRIEF DESCRIPTION OF THE DRAWINGS

A preferred embodiment of a software programmable DSP based hearing aid according to the invention is described in the following with reference to the drawings, wherein.

DETAILED DESCRIPTION OF A PREFERRED EMBODIMENT

In the following, a specific embodiment of a three chip-set DSP based hearing aid according to the invention is described and discussed in greater detail. The present description discusses in detail only an operation of the signal processing part of a DSP-core or kernel with associated memory circuits. An overall circuit topology that may form basis of the DSP hearing aid is well known to the skilled person and is, accordingly, reviewed in very general terms only.

Figure 1:
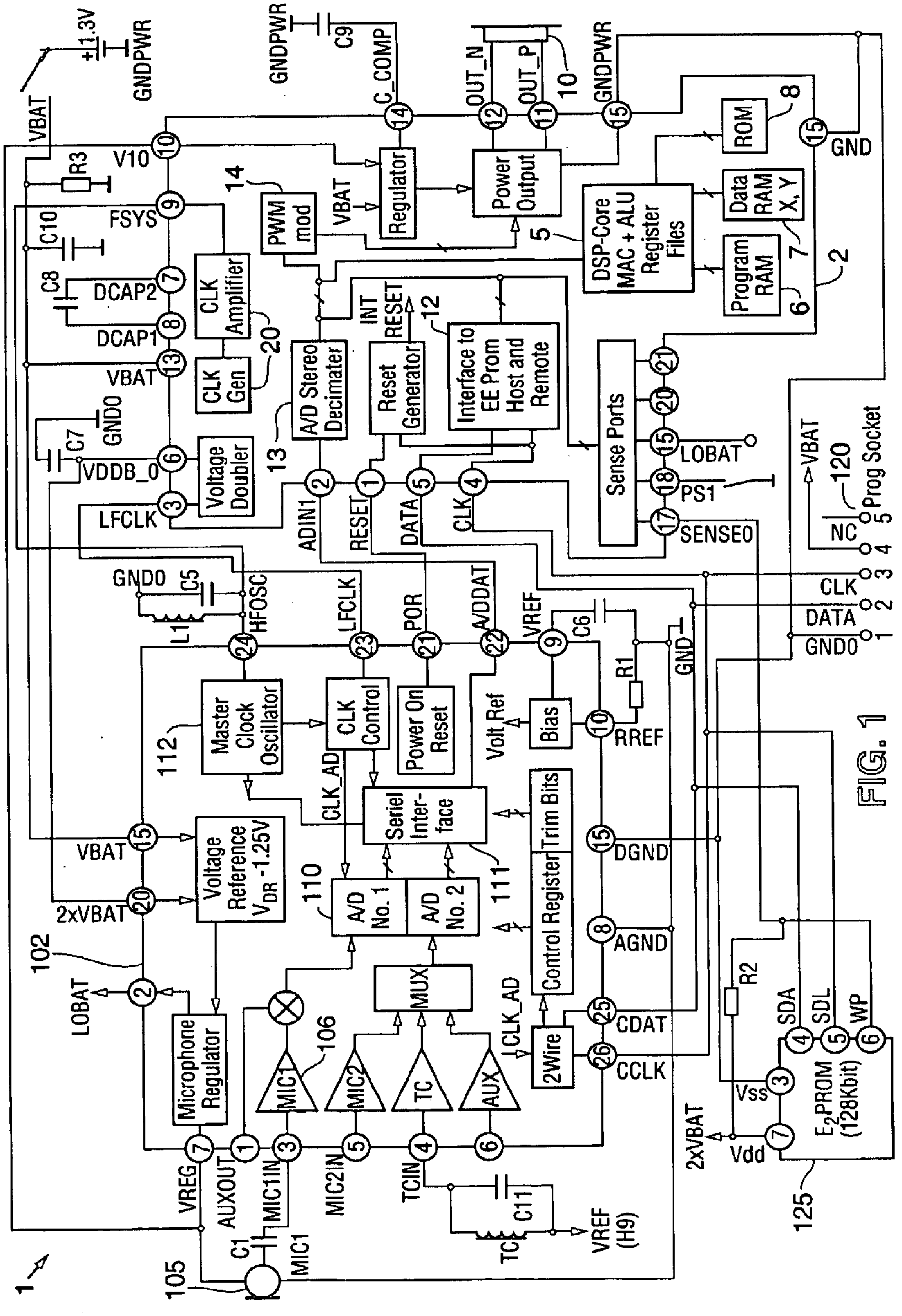
FIG. 1 is a simplified block diagram of three-chip DSP based hearing aid utilising Hidden Markov Models for input signal classification according to the invention.

In the simplified block diagram of FIG. 1, a conventional hearing aid microphone 105 receives an acoustic signal from a surrounding listening environment. The microphone 105 provides an analogue input signal on terminal MIC1IN of a proprietary A/D integrated circuit 102. The analogue input signal is amplified in a microphone preamplifier 106 and applied to an input of a first A/D converter of a dual A/D converter circuit 110 comprising two synchronously operating converters of the sigma-delta type. A serial digital data stream or signal is generated in a serial interface circuit 111 and transmitted from terminal A/DDAT of the proprietary A/D integrated circuit 102 to a proprietary Digital Signal Processor circuit 2 (DSP circuit). The DSP circuit 2 comprises an A/D decimator 13 which is adapted to receive the serial digital data stream and convert it into corresponding 16 bit audio samples at a lower sampling rate for further processing in a DSP core 5. The DSP core 5 has an associated program Random Read Memory (program RAM) 6, data RAM 7 and Read Only Memory (ROM) 8. The signal processing of the DSP core 5, which is described below with reference to the signal flow diagram in FIG. 2 is controlled by program instructions read from the program RAM 6.

A serial bi-directional 2-wire programming interface 120 allows a host programming system (not shown) to communicate with the DSP circuit 2, over a serial interface circuit 12, and a commercially available EEPROM 125 to perform up/downloading of signal processing algorithms and/or associated algorithm parameter values.

A digital output signal generated by the DSP-core 5 from the analogue input signal is transmitted to a Pulse Width Modulator circuit 14 that converts received output samples to a pulse width modulated (PWM) and noise-shaped processed output signal. The processed output signal is applied to two terminals of hearing aid receiver 10 which, by its inherent low-pass filter characteristic converts the processed output signal to an corresponding acoustic audio signal. An internal clock generator and amplifier 20 receives a master clock signal from an LC oscillator tank circuit formed by L1 and C5 that in co-operation with an internal master clock circuit 112 of the A/D circuit 102 forms a master clock for both the DSP circuit and the A/D circuit 102. The DSP-core 5 may be directly clocked by the master clock signal or from a divided clock signal. The DSP-core 5 may be provided with a clock-frequency somewhere between 2–4 MHz.

Figure 2:
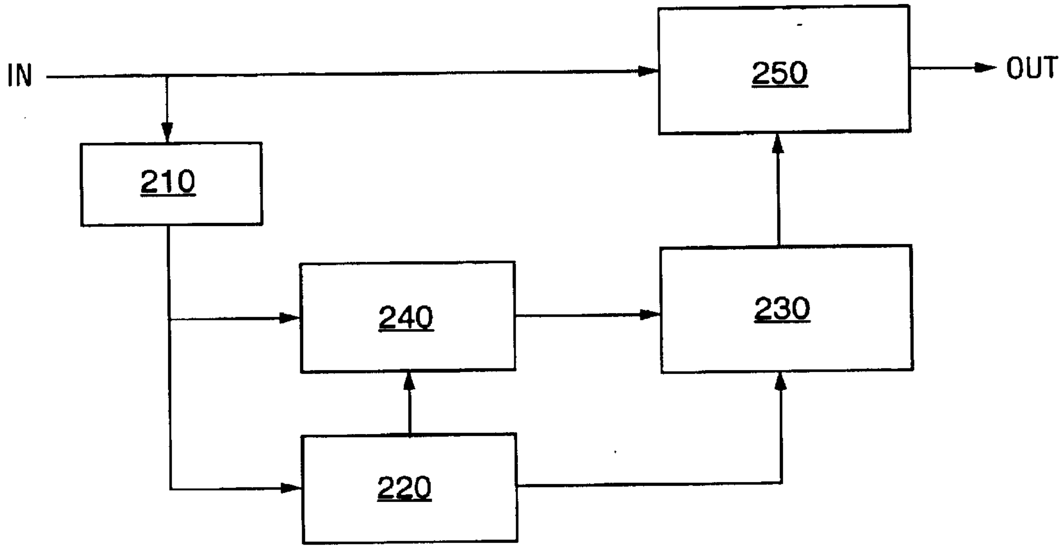
FIG. 2 is a signal flow diagram of a predetermined signal processing algorithm executed on the three-chip DSP based hearing aid shown in FIG. 1.
Figure 4:
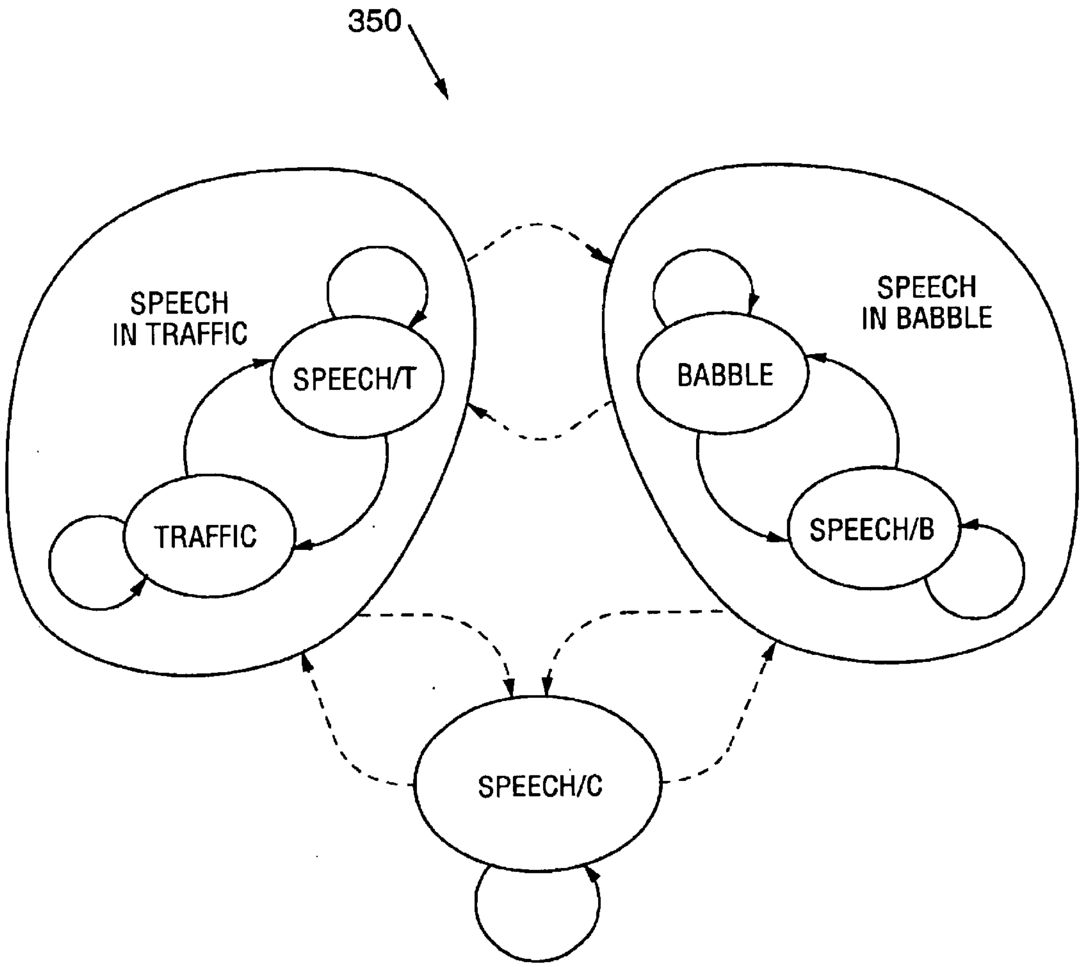
FIG. 4 is a state diagram for a second layer Hidden Markov Model.

FIG. 2 illustrates a listening environment classification system or classifier suitable for use in the hearing aid circuit of FIG. 1. The classifier uses a first and second layer of discrete Hidden Markov Models, in block 220, that model a set of primitive sound sources and a mixed sound source, respectively. The classifier makes the system capable of automatically and continuously classify the user's current listening environment as belonging to one of listening environment categories: speech in traffic noise, speech in babble noise, and clean speech as illustrated in FIG. 4. In the present embodiment of the invention, each listening environment is associated with a particular pre-set frequency response implemented by FIR-filter block 250 that receives its filter parameter values from a filter choice controller 230.

Operations of both the FIR-filter block 250 and the filter choice controller 230 are preferably performed by respective sub-routines or software modules which are executed from the program RAM 6 of the DSP core 5. The discrete Hidden Markov Models are also implemented as software modules in the program RAM 6 and respective parameter sets of $A^{source}$, $B^{source}$, $\alpha_0{}^{source}$ stored in data RAM 7 during execution of the Hidden Markov Models software modules. Switching between different FIR-filter parameter values is automatically performed when the user of the hearing aid moves between different categories of listening environments as recognized by classifier module 220. The user may have a favorite frequency response/gain for each listening environment category that can be recognized/classified. These favorite frequency responses/gains may been determined by applying a number of standard prescription methods, such as NAL, POGO etc, combined with individual interactive fine-tuning response adjustment. The two layers of discrete Hidden Markov Models of the classifier module 220 operate at differing time scales as will be explained with reference to FIGS. 3 and 4. Another possibility is to let the classifier 220 supplement an additional multi-channel AGC algorithm or system, which could be inserted between the input (IN) and the FIR-filter block 250, calculating, or determining by table lookup, gain values for consecutive signal frames of the input signal.

In FIG. 2, a digital input signal at node IN, provided by the output of the A/D decimator 13 in FIG. 1, is segmented into consecutive signal frames, each having a duration of 6 ms. The digital input signal has a sample rate of 16 kHz at this node whereby each signal frame consists of 96 audio signal samples. The signal processing is performed along of two different paths, in a classification path through signal module or blocks 210, 220, 240 and 230, and a predetermined signal processing path through block 250. Pre-computed impulse responses of the respective FIR filters are stored in the data RAM during program execution. The choice of parameter values or coefficients for the FIR filter module 250 is performed by a decision controller 230 based on the classification results from module 220, and, optionally, on data from the Spectrum Estimation Block 240.

Figure 3:
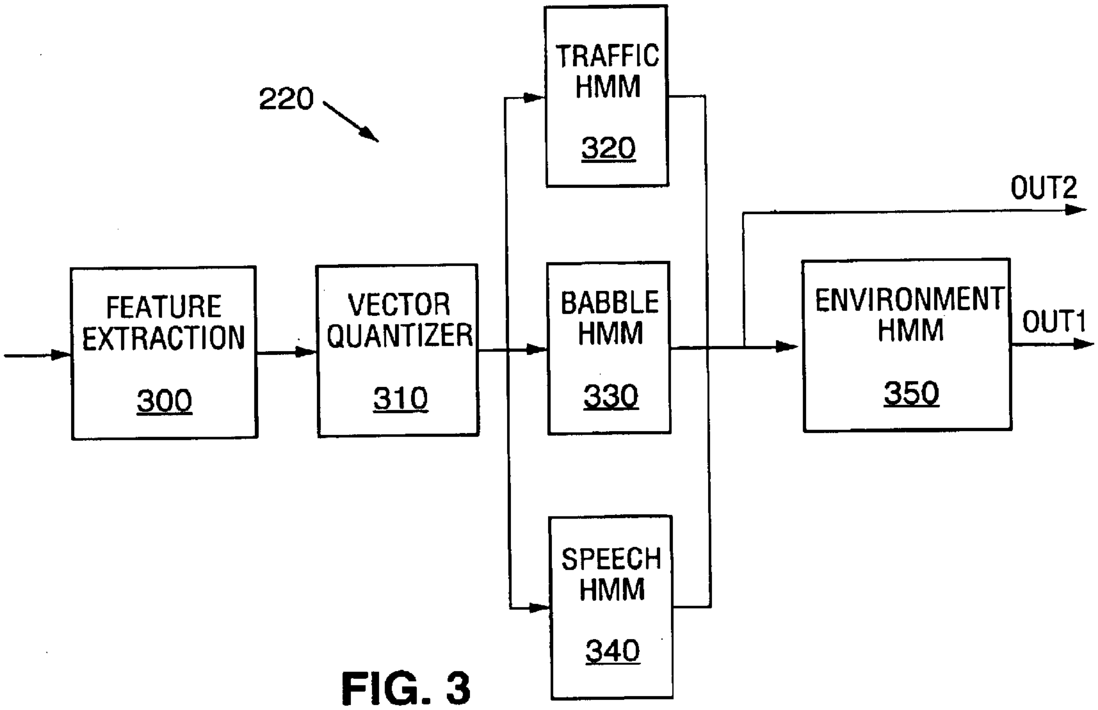
FIG. 3 is block and signal flow diagram illustrating a listening environment classifier and classification process in accordance with the invention.

FIG. 3 shows a signal flow diagram of a preferred implementation of the classifier 220 of FIG. 2. The classifier 220 has a dual layer Hidden Markov Model architecture wherein a first layer comprises three Hidden Markov Models 310-330 that operate on respective time-scales of envelope modulations of the associated primitive sound sources. The Hidden Markov Models 310–330 of the first layer model short term signal features of their associated sound sources.

A second layer Hidden Markov Model, in module 350, receives and processes running probability values for each discrete Hidden Markov Model in the first layer and operates on long term signal features of the digital input signal by analysing shifts in classification results between the discrete Hidden Markov Models of the first layer. The structure of the classifier 220 makes it possible to have different switching times between different listening environments, e.g. slow switching between traffic and babble and fast switching between traffic and speech. An initial layer in form of vector quantizer (VQ) block 310 precedes the dual layer Hidden Markov Model architecture.

The primitive sound sources modeled by the present embodiment of the invention are a traffic noise source, a babble noise source and a clean speech source. The embodiment may be extended to additionally comprise mixed sound sources such as speech and babble or speech and traffic noise at a target SNR. The final output of the classifier is a listening environment probability vector, OUT1, continuously indicating a current probability estimate for each listening environment category modelled by the second layer Hidden Markov Model. A sound source probability vector, OUT2, indicates respective estimated probabilities for each primitive sound source modeled by modules 310, 320, 330. In the present embodiment of the invention, a listening environment category comprises one of the predetermined sound sources 310, 320 or 330 or a combination of two or more of the primitive sound sources as explained in more detail in the description of FIG. 4.

The processing of the input signal in the classifier 220 of FIG. 3 is described in the following with additional reference to FIG. 5 that illustrates computation or extraction of substantially level independent feature vectors:

The input signal at node IN at time t is segmented into frames or blocks x(t), of size B, with input signal samples:

$$x(t)=[x_1(t)x_2(t)\ \ldots\ x_B(t)]^T$$

x(t) is multiplied with a window, $w_n$, and a Discrete Fourier Transform, DFT, is calculated.

$$X_k(t)=\frac{1}{B}\sum_{n=0}^{B-1} w_n x_n(t)e^{-j\frac{2\pi kn}{B}}\quad k=0\ \ldots\ B/2-1$$

A feature vector is extracted for every new frame by feature extraction module 300 of FIG. 3. It is presently preferred to use 4 real cepstrum parameters for each feature vector, but fewer or more cepstrum parameters may naturally be utilized such as 8, 12 or 16 parameters.

$$c_k(t)=\sum_{n=0}^{B/2-1}\cos\left(\frac{2\pi kn}{B}\right)\log|X_n(t)|\quad k=0\ \ldots\ 3$$

The output at time t is a feature column vector, f(t), with continuous valued elements.

$$f(t)=[c_0(t)c_1(t)\ \ldots\ c_3(t)]^T$$

Figure 5:
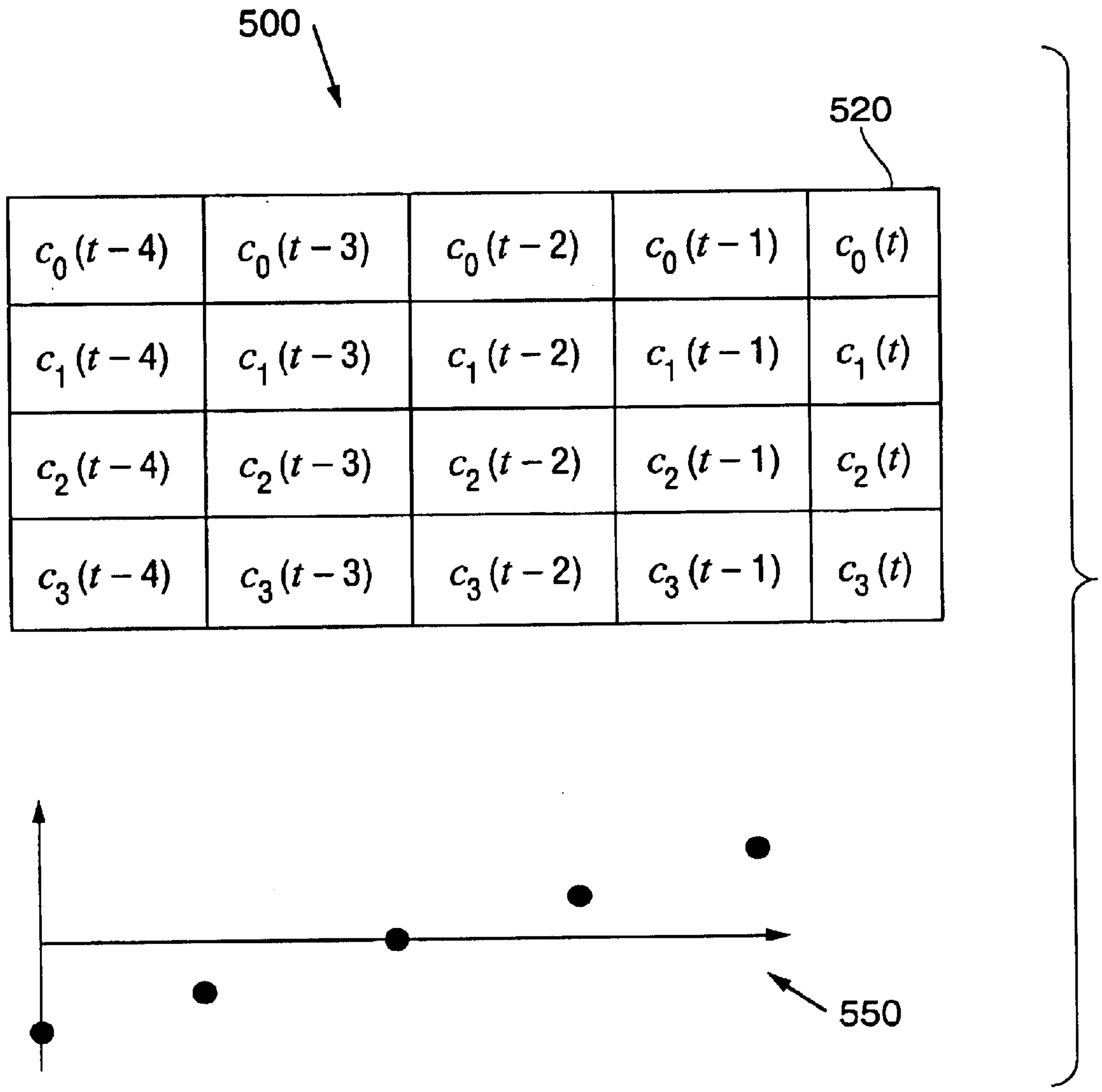
FIG. 5 shows a preferred feature vector extraction process that generates substantially level independent signal features of the input signal.

As shown in FIG. 5, a column 520 of buffer memory 500 in the data RAM stores a set of 4 cepstrum parameters c.sub.0(t)–c.sub.3(t) that represent the extracted signal features at time=t. Other columns of buffer memory 500 hold corresponding sets of cepstrum parameters for the previous four input signal frames, c.sub.n(t−1)–c.sub.n(t−4).

To derive the desired delta or differential cepstrum parameters, linear regression with illustrated regression function 550 in the buffer memory 500 is used. To derive a differential cepstrum coefficient that corresponds to $c_0(t)$, the first point in the regression function 550 is multiplied with the oldest value in the buffer, $c_0(t-4)$ and the next point of the regression function is multiplied with the next oldest value in the buffer, $c_0(t-3)$ etc. Thereafter, all multiplications are summed and the result is the corresponding delta cepstrum coefficient, i.e. an estimate of a derivative of the cepstrum coefficient sequence at time=t. A similar regression calculation is applied to $c_1(t)$–$c_3(t)$ to derive their respective delta cepstrum coefficients.

The differential cepstrum parameter vector may accordingly be calculated by FIR filtering each time sequence of cepstrum parameter values, e.g. $c_0(t)$–$c_0(t-4)$, as:

$$\Delta f(t) = \sum_{i=0}^{K-1} h_i f(t-i),$$

where $h_i$ is determined such that $\Delta f(t)$ approximates the first differential of f(t) with respect to the time t. The length of the FIR filter defined by coefficients $h_i$ may be selected to a value between 4 and 32 such as K=8.

Alternatively, a corresponding IIR filter may be used as a regression function by filtering each time sequence of cepstrum parameter values to determine the corresponding differential cepstrum parameter values.

In yet another alternative, level independent signal features are extracted directly from a running FFTs or DFTs of the input signal frames. The cepstrum parameter sets of the columns of buffer memory 500 are replaced by sets of frequency bin values and the regression calculations on individual frequency bin values proceed in a manner corresponding to the one described in connection with the use of cepstrum parameters. The delta-cepstrum coefficients are sent to the vector quantizer in the classification block 220. Other features, e.g. time domain features or other frequency-based features, may be added.

The input to the vector quantizer block 210 is a feature vector with continuously valued elements. The vector quantizer has M=32, the number of feature vectors in the codebook $[c^1 \ldots c^M]$ approximating the complete feature space. The feature vector is quantized to closest codeword in the codebook and the index o(t), an integer index between 1 and M, to the closest codeword is generated as output.

$$O(t) = \underset{i=1 \ldots M}{\operatorname{argmin}} \| \Delta f(t) - c^i \|^2$$

The VQ is trained off-line with the Generalized Lloyd algorithm (Linde, 1980). Training material consisted of real-life recordings of sounds-source samples. These recordings have been made through the input signal path, shown on FIG. 1, of the DSP based hearing instrument.

It has been noticed that some observation probabilities may be zero after training of the classifier, which is believed to be unrealistic. Therefore, the observation probabilities were smoothed after the training procedure. A fixed probability value was added for each observation and state, and the probability distributions were then re-normalized. This makes the classifier more robust: Instead of trying to classify ambiguous sounds, the forward variable remains relatively constant until more distinctive observations arrive.

Each of the three predetermined sound sources is modeled by a corresponding discrete Hidden Markov Model. Each Hidden Markov Model consists of a state transition probability matrix, $A^{source}$, an observation symbol probability distribution matrix, $B^{source}$, and an initial state probability distribution column vector, $\alpha_0^{source}$. A compact notation for a Hidden Markov Model is, $\lambda^{source}=\{A^{source}, B^{source}, \alpha_0^{source}\}$. Each predetermined sound source or sound source model has N=4 internal states and observes the stream of VQ symbol values or centroid indices $[O(1) \ldots O(t)]$ $O_t \epsilon [1, M]$. The current state at time t is modelled as a stochastic variable $Q^{source}(t) \epsilon \{1, \ldots, N\}$.

The purpose of the first layer is to estimate how well each source model can explain the current input observation O(t). The output is a column vector u(t) with elements indicating the conditional probabilities $\phi^{source}(t)=\text{prob}(O(t)|O(t-1), \ldots, O(1), \lambda^{source})$ for each predetermined sound source.

The standard forward algorithm (Rabiner, 1989) is used to update recursively the state probability column vector $p^{source}(t)$. The elements $p_i^{source}(t)$ of this vector indicate the conditional probability that the sound source is in state i, $$p_i^{soucre}(t)=\text{prob}(Q^{source}(t)=i, o(t)|o(t-1), \ldots, o(1), \lambda^{source}).$$

The recursive update equations are:

$$p^{source}(t)=((A^{source})^T \hat{p}^{source}(t-1)) \circ b^{source}(o(t))$$

$$\phi^{source}(t) = prob(o(t) \mid o(t-1), \ldots, o(1), \lambda^{source}) = \sum_{i=1}^{N} p_i^{source}(t)$$

$$\hat{p}_i^{source}(t) = p_i^{source}(t) \Big/ \sum_{i=1}^{N} p_i^{source}(t)$$

wherein operator $\circ$ defines element-wise multiplication.

FIG. 4 is a more detailed illustration of the final or second layer Hidden Markov Model 350 of FIG. 3. The second layer Hidden Markov Models comprises five states and continuously classifies the user's current listening environment as belonging to one of three different listening environment categories.

Signal OUT1 of the second layer Hidden Markov Model layer 550 estimates running probabilities for each of the modelled listening environments by observing the sequence of sound source probability vectors provided by the previous, i.e. first, layer of discrete Hidden Markov Model. A listening environment category is represented by a discrete stochastic variable $E(t) \epsilon \{1 \ldots 3\}$, with outcomes coded as 1 for "speech in traffic noise", 2 for "speech in cafeteria babble", 3 for "clean speech". The classification results are thus represented by an output probability vector with three elements, one element for each of these environment categories. The final Hidden Markov Model layer 550 contains five states representing Traffic noise, Speech (in traffic, "Speech/T"), Babble, Speech (in babble, "Speech/B"), and Clean Speech ("Speech/C"). Transitions between listening environments, indicated by dashed arrows, have low probability, and transitions between states within one listening environment, shown by solid arrows, have relatively high probabilities.

The second layer Hidden Markov Model layer 550 consists of a Hidden Markov Model with five internal states and transition probability matrix $A^{env}$ (FIG. 4). The current state in the environment hidden Markov model is modelled as a discrete stochastic variable $S(t) \epsilon \{1 \ldots 5\}$, with outcomes coded as 1 for "traffic", 2 for speech (in traffic noise, "speech/T"), 3 for "babble", 4 for speech (in babble, "speech/B"), and 5 for clean speech "speech/C".

The speech in traffic noise listening environment, E(t)=1, has two states S(t)=1 and S(t)=2. The speech in cafeteria babble listening situation, E(t)=2, has two states S(t)=3 and S(t)=4. The clean speech listening environment, E(t)=3, has only one state, S(t)=5. The transition probabilities between listening environments are relatively low and the transition probabilities between states within a listening environment are high.

The second layer Hidden Markov Model 550 observes the stream of vectors $[u(1) \ldots u(t)]$, where $u(t)=[\phi^{traffic}(t)\ \phi^{speech}(t)\ \phi^{babble}(t)\ \phi^{speech}(t)\ \phi^{speech}(t)]^T$ containing the estimated observation probabilities for each state. The probability for being in a state given the current and all previous observations and given the second layer Hidden Markov Model, $\hat{p}_i^{env}$=prob(S(t)=i|u(t), . . . , u(1), $A^{env}$), is calculated with the forward algorithm (Rabiner, 1989), $p^{env}(t)=((A^{env})^T\hat{p}^{env}(t-1))\circ u(t)$, with elements $p_i^{env}$=prob(S(t)=i, u(t)|u(t−1), . . . , u(1), $A^{env}$), and finally, with normalization, $\hat{p}^{env}(t)=p^{env}(t)/\Sigma p_1^{env}(t)$.

The probability for each listening environment, $p^E(t)$, given all previous observations and given the second layer Hidden Markov Model, can now be calculated as:

$$p^E(t)=\begin{pmatrix}1&1&0&0&0\\0&0&1&1&0\\0&0&0&0&1\end{pmatrix}\hat{p}^{env}(t).$$

As previously mentioned, the spectrum estimation block 240 of FIG. 2 is optional but may be utilized to estimate an average frequency spectrum which adapts slowly to the current listening environment category.

Another advantageous feature would be to estimate two or more slowly adapting spectra for different predetermined sound sources in a given listening environment, e.g. a speech spectrum which represent a target signal and a spectrum of an interfering noise source, such as babble or traffic noise. The source probabilities, $\phi^{source}(t)$, the environment probabilities $p^E(t)$, and the current log power spectrum, X(t), are used to estimate current target signal and interfering noise signal log power spectra. Two low-pass filters are used in the estimation, one filter for the signal spectrum and one filter for the noise spectrum. The target signal spectrum is updated if $p_1^E(t)>p_2^E(t)$ and $\phi^{speech}(t)>\phi^{traffic}(t)$ or if $p_2^E(t)>p_1^E(t)$ and $\phi^{speech}(t)>\phi^{babble}(t)$. The interfering noise spectrum is updated if $p_1^E(t)>p_2^E(t)$ and $\phi^{traffic}(t)>\phi^{speech}(t)$ or if $p_2^E(t)>p_1^E(t)$ and $\phi^{babble}(t)>\phi^{speech}(t)$.

Figure 6:
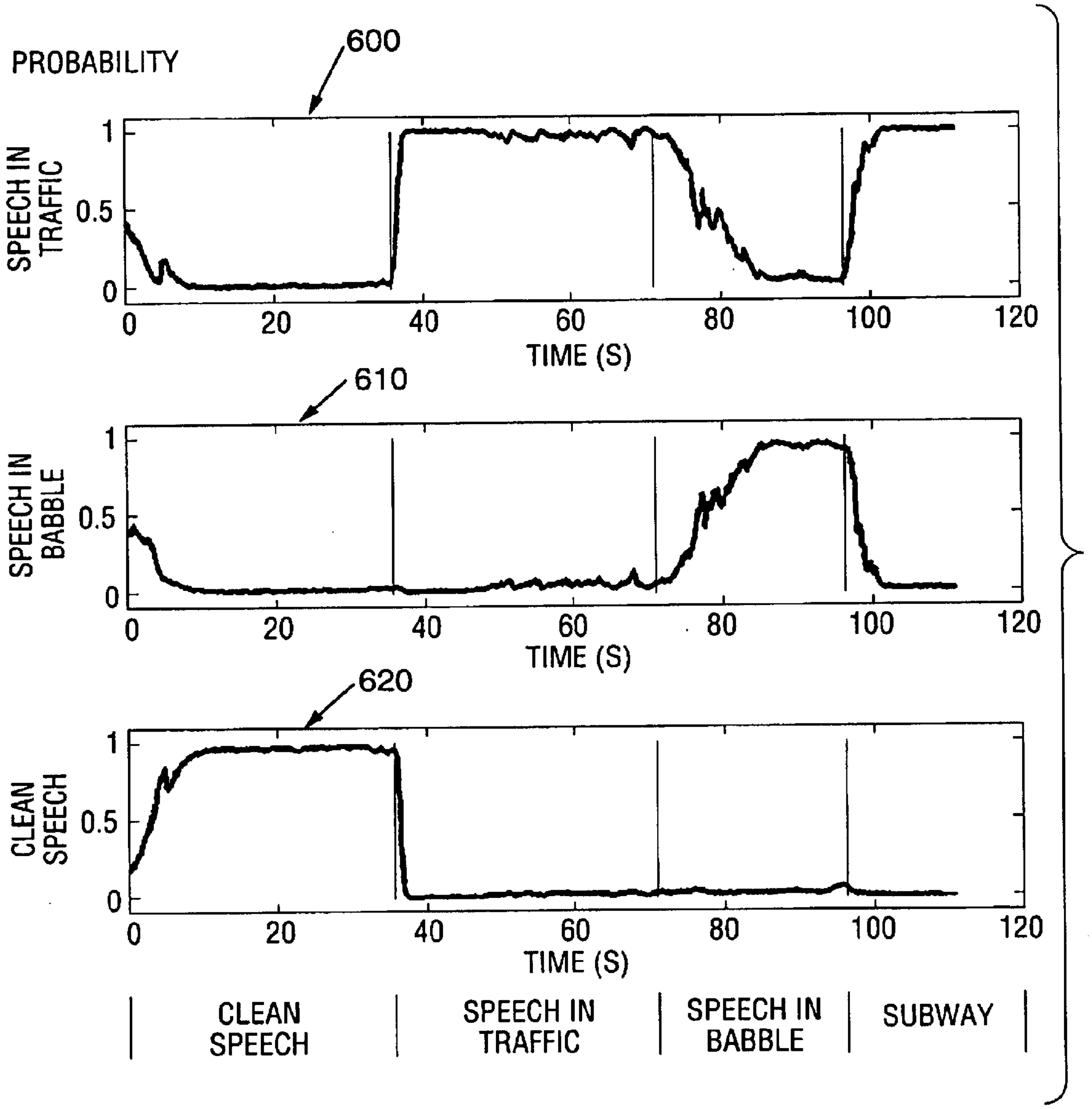
FIG. 6 shows experimental listening environment classification results from the Hidden Markov Model based classifier according to the invention.

FIG. 6 shows experimental listening environment classification results. The curve in each panel or graph, one for each of the three listening environment categories, indicates the estimated probability values for the relevant listening environment category as a function of time. The sound recording material used for the experimental evaluation was different from the material that was used in the training of the classifier.

Upper graph 600 shows classification results from the listening environment category Speech in Traffic noise. A concatenated sound recording was used as test material to provide four different types of predetermined sound sources as input stimuli to the classifier. The types of predetermined sound sources are indicated along the horizontal axis that also shows time. Thin vertical lines show actual transition points in time between differing types of predetermined sound sources in the sound recording material that simulates different listening environments in the concatenated sound recording.

The graphs 600–620 show the dynamic behavior of the classifier when the type of predetermined sound source is shifted abruptly. The obtained classification results shows that a shift from one listening environment category to another is indicated by the classifier within 4–5 seconds after an abrupt change between two types of predetermined sound sources, i.e. an abrupt change of stimulus. The shift from speech in traffic noise to speech in babble took about 15 seconds.

Notation:

M Number of centroids in Vector Quantizer

N Number of States in Hidden Markov Model $\lambda^{source}=\{A^{source}, B^{source}, \pi^{source}\}$ compact notation for a discrete Hidden Markov Model, describing a source, with N states and M observation symbols B Blocksize $O=[O_{-\infty} \ldots O_t]$ Observation sequence $O_{t\in[}1, M]$ Discrete observation at time t f(t) Feature vector w Window of size B x(t) One block of size B, at time t, of raw input samples X(t) The corresponding discrete complex spectrum, of size B, at time t References L. R. Rabiner, A Tutorial on Hidden Markov Models and Selected Applications in Speech Recognition. Proc. IEEE, vol. 77, no. 2, February 1989

Linde, Y., Buzo, A., and Gray, R. M. An Algorithm for Vector Quantizer Design. IEEE Trans. Comm., COM-28:84–95, January 1980.

What is claimed is:

1. A hearing prosthesis comprising:

an input signal channel providing a digital input signal in response to acoustic signals from a listening environment, processing means adapted to process the digital input signal in accordance with a predetermined signal processing algorithm to generate a processed output signal, an output transducer for converting the processed output signal into an electrical or an acoustic output signal, the processing means being further adapted to:

extract feature vectors, O(t), representing predetermined signal features of consecutive signal frames of the digital input signal, process the extracted feature vectors, or symbol values derived therefrom, with a Hidden Markov Model associated with a predetermined sound source to determine probability values for the predetermined sound source being active in the listening environment, wherein the extracted features vectors represent substantially level independent signal features, or absolute spectrum shape independent signal features, of the consecutive signal frames.

2. A hearing prosthesis according to claim 1, wherein the extracted features vectors comprise respective sets of differential signal features.

3. A hearing prosthesis according to claim 2, wherein the extracted features vectors comprise respective sets of differential cepstrum parameters or differential temporal signal features.

4. A hearing prosthesis according to claim 3, wherein the sets of differential cepstrum parameters are derived by filtering a sequence of cepstrum parameters determined from the consecutive signal frames of the digital input signal.

5. A hearing prosthesis according to claim 1, wherein the processing means are adapted to categorize a user's current listening environment as belonging to one of several different categories of listening environments based on the determined probability values.

6. A hearing prosthesis according to claim 5, wherein the processing means are adapted to control characteristics of the predetermined signal processing algorithm in dependence of the determined listening environment category.

7. A hearing prosthesis according to claim 6, comprising a first layer of Hidden Markov Models associated with respective primitive sound sources and providing probability values for each primitive sound source being active, second layer comprising at least one Hidden Markov Model modelling the different categories of listening environments and adapted to receive and process the probability values provided by the first layer to categorize the user's current listening environment.

8. A hearing prosthesis according to claim 7, wherein the primitive sound sources represent short term features of the digital input signal and the at least one Hidden Markov Model models long term features of digital input signal.

9. A hearing prosthesis according to claim 8, wherein the short term signal are features within a range of 10–100 ms, and the long term signal features are features within a range of 1–60 seconds.

10. A hearing prosthesis according to claim 7, wherein at least some transition probabilities between internal states of the at least one Hidden Markov Model have been manually set by utilising a priori knowledge of switching probabilities between the different categories of listening environments.

11. A hearing prosthesis according to claim 1, wherein the Hidden Markov Model comprises a discrete Hidden Markov Model adapted to process symbol values derived from the extracted feature vectors.

12. A hearing prosthesis according to claim 1, wherein the predetermined sound source represents a sound source selected from a group of {clean speech, traffic noise, babble, telephone speech, subway noise, wind noise, music} or models a combination of several sound sources of that group.

* * * * *

UNITED STATES PATENT AND TRADEMARK OFFICE

CERTIFICATE OF CORRECTION

PATENT NO. : 6,862,359 B2
DATED : March 1, 2005
INVENTOR(S) : Nils Peter Nordqvist and Arne Leijon It is certified that error appears in the above-identified patent and that said Letters Patent is hereby corrected as shown below:

Column 18,
Lines 35, 40 and 43, replace "extracted features vectors" with -- extracted feature vectors --.

Column 19,
Line 4, replace "features of digital" with -- features of the digital --.

Signed and Sealed this

Eighth Day of November, 2005

JON W. DUDAS
*Director of the United States Patent and Trademark Office*